US009973999B2

(12) United States Patent
Gormley et al.

(10) Patent No.: US 9,973,999 B2
(45) Date of Patent: *May 15, 2018

(54) METHOD AND APPARATUS FOR SELF ORGANIZING NETWORKS

(71) Applicant: NOKIA SOLUTIONS AND NETWORKS OY, Espoo (FI)

(72) Inventors: Eamonn Gormley, Bothell, WA (US); Anthony Keng-San Wong, Bothell, WA (US); Stephan McLaughlin, Bothell, WA (US); Timothy Treptow, Bothell, WA (US); David James Ryan, Bothell, WA (US); Jeffrey Paul Harrang, Sammamish, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/654,530

(22) Filed: Jul. 19, 2017

(65) Prior Publication Data

US 2017/0367028 A1    Dec. 21, 2017

Related U.S. Application Data

(63) Continuation of application No. 14/191,286, filed on Feb. 26, 2014, now Pat. No. 9,730,143.

(Continued)

(51) Int. Cl.
*G06F 9/44*     (2018.01)
*H04W 40/24*   (2009.01)
*H04W 24/02*   (2009.01)

(52) U.S. Cl.
CPC ........... *H04W 40/24* (2013.01); *H04W 24/02* (2013.01)

(58) Field of Classification Search
USPC ......................................................... 719/328
See application file for complete search history.

(56) References Cited

U.S. PATENT DOCUMENTS 8,762,511 B2 *   6/2014   Cleary ................... H04W 24/00
                                                       709/223
2006/0117325 A1   6/2006   Wieland et al.
(Continued)

FOREIGN PATENT DOCUMENTS

EP   2453691   5/2012
GB   2481719   1/2012
(Continued)

OTHER PUBLICATIONS

3rd Generation Partnership Project, "Technical Specification Group Services and System Aspects; Telecommunication Management; Self-Organizing Networks (SON); Concepts and Requirements (Release 11)," 3GPP TS 32.500 V11.10 (Dec. 2011), pp. 13.

(Continued)

*Primary Examiner* — Andy Ho

(57) ABSTRACT

A method for running a Self Organizing Network (SON) module in a communication network provides an open Application Programming Interface (API) for a SON framework and executes the SON module. The SON module accesses the functionality of the SON framework using the API. The SON module may be built by a developer other than a SON system provider and may be loaded into the SON framework by an operator other than a SON system provider. The SON module may be implemented as a state machine.

21 Claims, 7 Drawing Sheets

Related U.S. Application Data

(60) Provisional application No. 61/807,418, filed on Apr. 2, 2013.

(56) References Cited

U.S. PATENT DOCUMENTS

| | | |
|---|---|---|
| 2010/0232318 A1 | 9/2010 | Sarkar |
| 2010/0264470 A1 | 10/2010 | Thirupapuliyur et al. |
| 2010/0299419 A1 | 11/2010 | Ramankutty et al. |
| 2012/0064908 A1 | 3/2012 | Fox et al. |
| 2012/0264470 A1 | 10/2012 | Bajj et al. |
| 2012/0307697 A1 | 12/2012 | Mukhopadhyay |
| 2014/0068034 A1* | 3/2014 | Tapia .................... H04L 41/082 709/221 |

FOREIGN PATENT DOCUMENTS

| | | |
|---|---|---|
| GB | 2481721 | 1/2012 |
| WO | WO2013036793 | 3/2013 |

OTHER PUBLICATIONS

Search Report and Written Opinion dated May 26, 2014 for PCT Application No. PCT/US2014/018793.
Search Report dated Feb. 2, 2017 for European Application No. 14778598.4.
Dimitrov, et al., "A Combinatorial Model for Self-Organizing Networks," IEEE, Parallel and Distributed Processing Symposium, 2007, pp. 8.
Office Action dated Dec. 21, 2017 for European Application No. 14778598.4.

* cited by examiner

FIG. 4

| Function | Brief Description | When called? |
|---|---|---|
| GetDesc() | Returns text string that describes the functionality of the SON Module for display on a user interface. | SON Module Import |
| GetEventTypes() | Returns the list of event types (KPI, Time, Alarm, Messaging) that this SON Module may be informed of. | SON Module Import |
| GetVersion() | Returns version information about the SON Module. | SON Module Import |
| SON Module Main Function, e.g., ScriptMain( scriptData ) | Entry point of the SON Module. The entry point may be retrieved by the SON Framework by calling the GetEntryPoint() function. If the GetEntryPoint() function is not provided, the SON Framework may call a default function (e.g., ScriptMain()) as the default entry point. | New data/events arrives for SON Module |

FIG. 5

| Function | Brief Description | When called? |
|---|---|---|
| GetEntryPoint() | Returns the function that the SON Framework should call as the entry point of the SON Module. If the GetEntryPoint() function is not provided, then the SON Framework will call a default function (e.g., ScriptMain()) as the default entry point. | SON Module Import |
| GetMonitoredAlarms() | Returns the list of alarm names that this SON Module may receive notifications of. | SON Module Import |
| GetMonitoredKPIs() | Returns the list of KPIs that this SON Module receives. | SON Module Import |
| GetMonitoredMessages() | Returns a list of protocol messages that this SON Module receives. | SON Module Import |
| GetParameters() | Returns SON Module configurable parameters data. | SON Module Import |
| GetTimeEvent() | Informs the framework of times that the SON Module should be triggered. May be specified using a cronjob style string. | SON Module Import |
| StopHandler(ModuleData) | Called by the framework to allow the SON Module to gracefully handle clean-up. | User or external event terminates SON Module |

FIG. 7

| SON_EVT_CALENDAR_START | The SON Module has been started by a user scheduled calendar event. |
|---|---|
| SON_EVT_CALENDAR_STOP | The end of the calendar event time has been reached and the SON Module should now terminate. |
| SON_EVT_TIME | A time event has occurred. Time events may be scheduled by SON Modules via the GetTimeEvent() callback function |
| SON_EVT_KPI | New KPIs have arrived for the SON Module |
| SON_EVT_ALARM | An external alarm has occurred for which the SON Module has requested notification |
| SON_EVT_MSG | An external protocol message event for which the SON Module has requested notification has occurred. |
| SON_EVT_EXIT | Normal exit event when a SON Module calls a ScriptExit() function |
| SON_EVT_ABORT | An abnormal exception event that is sent to a SON Module |
| SON_EVT_INTERRUPT | Module has been interrupted by higher priority SON Module |

…

METHOD AND APPARATUS FOR SELF ORGANIZING NETWORKS

CROSS-REFERENCES TO RELATED APPLICATIONS

This application is a continuation of U.S. patent application Ser. No. 14/191,286, filed Feb. 26, 2014, now issued as U.S Pat. No. 9,730,143, which claims the benefit of U.S. Provisional Patent Application No. 61/807,418, filed Apr. 2, 2013, which is herein incorporated by reference for all purposes.

BACKGROUND

Self Organizing Networks (SON) refers to technologies that automate key network configuration and optimization functions. These technologies often implement specific SON "use cases." Examples of SON use cases can be found in the Next Generation Mobility Networks (NGMN) Alliance publication "NGMN Informative List of SON Use Cases" and the Third Generation Partnership Project (3GPP) publication 36.902, "Configuring and self-optimizing network (SON) use cases and solutions." However, additional SON use cases beyond those in these publications can be specified.

In a communication network, a SON system implements SON use cases to configure and optimize the performance of the communications network. Normally, SON systems implement a specific set of SON use cases and require updates from the provider of the SON system to implement additional SON use cases. The operator of the network is therefore dependent on the provider of the SON system for implementation of new SON use cases. In some cases, the operator may have their own SON use cases that they would like to have implemented in the network. However, an operator may never see these uses cases implemented if the SON system vendor does not implement these use cases in the SON system product.

BRIEF SUMMARY

Embodiments of the present invention provide a SON system that permits an operator or other third parties to develop and implement the logic for additional SON use cases and deploy and test this logic in a communications network, such as a wireless communications network, without being dependent on the SON system provider. The methods and apparatus described in this document permit known SON use cases and additional use cases that may be identified to be deployed, managed and configured in the communications network.

An embodiment of a method for running a Self Organizing Network (SON) module in a communication network comprises providing an open Application Programming Interface (API) for a SON framework and executing the SON module, wherein the SON module accesses the functionality of the SON framework using the API.

In an embodiment, the method further comprises loading the SON module into the SON framework through a user interface. The SON module may be built by a developer other than a SON system provider and loaded into the SON framework by an operator other than the SON system provider.

In an embodiment, the SON module is implemented as a state machine. The method may further comprise initiating the state machine, waiting for an event trigger, and when the event trigger occurs, executing a primary function of the state machine and exiting the SON module. The method may further comprise initiating the state machine, waiting for an event trigger, and when the event trigger occurs, executing a primary function of the state machine and returning the state machine to a state of waiting for the event trigger.

In an embodiment, the method further comprises providing a configuration interface in the API, accepting a configuration parameter input from a user through the configuration interface, and retrieving, by the SON framework, the configuration parameter when the SON module is executed. The configuration parameter may include one or more of a parameter name, a parameter description, a parameter type, a parameter default value, and a parameter range.

In an embodiment, the method further comprises transmitting information about an external event to monitor from the SON module to the SON framework, and monitoring for the external event by the SON framework. When the SON framework detects the external event, the external event information may be transmitted to the SON module. The event may be a Key Performance Indicator (KPI) available event, an alarm event, a configuration change event, or a change made to the network by an external system.

In an embodiment, the method further comprises accessing network Operations Support System (OSS) information using the API.

In an embodiment, the SON module, using the API, displays information on a user interface of the SON system.

In an embodiment, the SON module has a priority, and the SON framework determines whether to execute the SON module using the priority.

In an embodiment, the method further comprises launching a child SON module by the SON module. The SON framework may permit the SON module to launch the child SON module, but not permit the child SON module to launch a second child SON module.

In an embodiment, the method further comprises providing, through the API, a Radio Frequency (RF) prediction engine of the SON system to the SON module, the RF prediction engine providing a prediction of an impact of a change of one or more network parameters.

In an embodiment, the method further comprises providing, through the API, a geo-location function of the SON system to the SON module, the geo-location function providing a location of one or more network devices.

An embodiment of a Self Organizing Network (SON) system for automating functions in a communication network comprises at least one computer system including a SON framework, wherein the at least one computer system is configured to perform one or more of the methods listed above.

An embodiment of a non-transitory computer-readable medium comprises computer-executable instructions for running a Self Organizing Network (SON) module in a communication network, instructions when executed perform one or more of the methods listed above.

BRIEF DESCRIPTION OF THE DRAWINGS

FIG. 4 is a table showing mandatory framework callable functions of a SON Module according to an embodiment.

FIG. 5 is a table showing optional framework callable functions of a SON Module according to an embodiment.

FIG. 7 is a table showing constant values associated with an Application Programming Interface (API) according to an embodiment.

DETAILED DESCRIPTION

Figure 1:
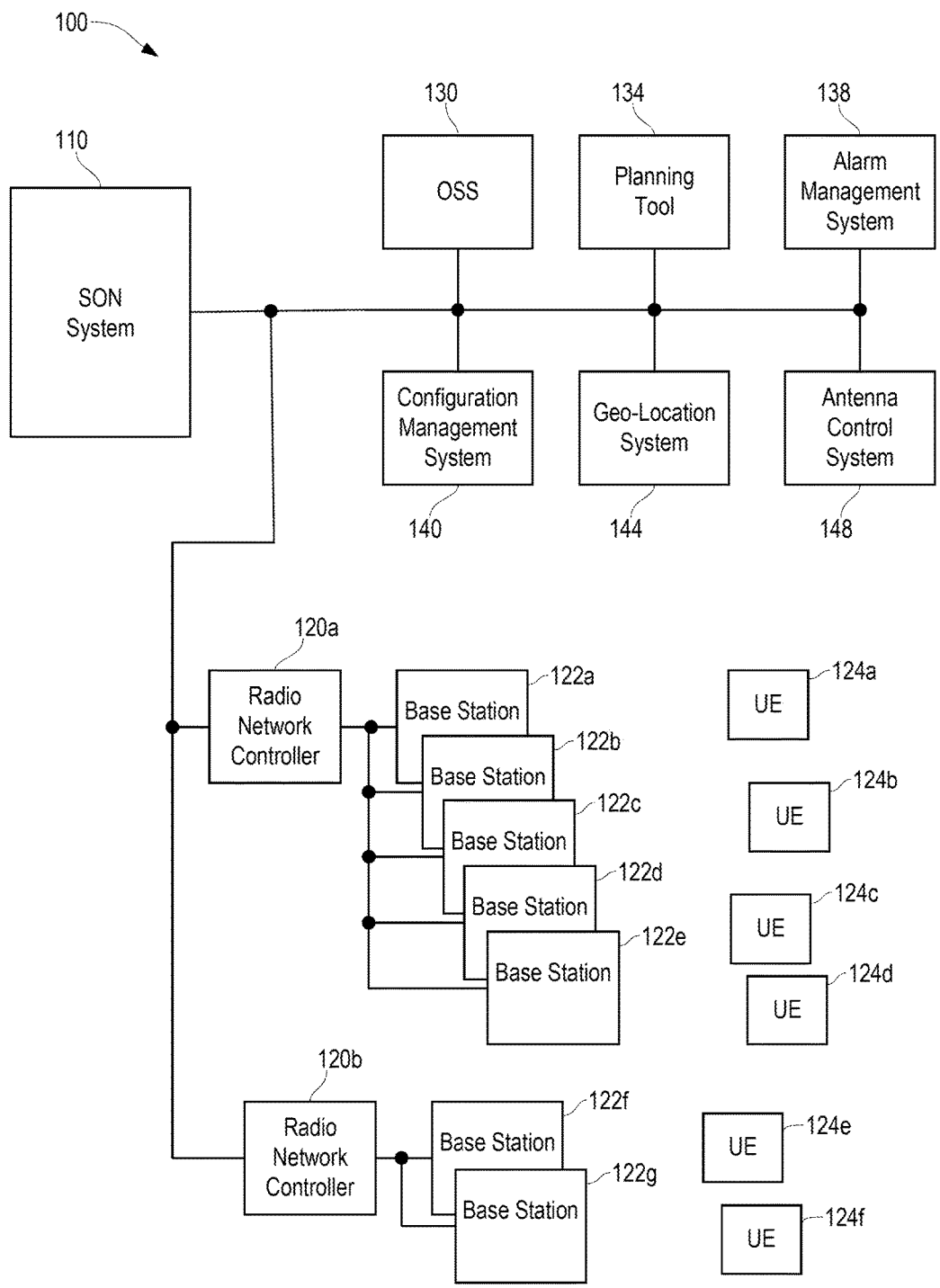
FIG. 1 illustrates a wireless communication network including a SON system.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, including processing the data by executing computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 shows an example of a SON system 110 deployed in a wireless communications network 100. The SON system 110 comprises at least one computer system, and is connected to the components of the wireless communication network 100 including first and second Radio Network Controllers (RNCs) 120a and 120b.

The first and second RNCs 120a and 120b are connected to first through fifth base stations 122a-122e and sixth and seventh wireless base stations 122f and 122g, respectively. In an embodiment, one or more of the RNCs 120a-120b are integrated into a wireless base station. In an embodiment, each of the wireless base stations 122a-122g includes an RNC.

Each of the wireless base stations 122a-122g may be a NodeB, an eNodeB, a Home eNodeB (HeNB), et cetera. The wireless base stations 122a-122g may be used with macrocells, microcells, picocells, and femtocells, and may employ one or more of Long Term Evolution (LTE™), Universal Mobile Telecommunications System (UMTS™), Global System for Mobile communications (GSM™), Code Division Multiple Access (CDMA), Wi-Fi®, WiMax™, or other similar wireless communication technologies.

The wireless base stations 122a-122g are wirelessly connected to first through sixth User Equipment (UEs) 124a through 124f UEs 124a-24f may be any combination of laptop computers, tablet computers, desktop computers, wireless hotspot devices, wireless modems, cellular phones, pagers, handheld gaming units, electronic book devices, personal music players, MiFi™ devices, video recorders, wireless-enabled automotive systems, et cetera.

The SON system 110 interfaces with a number of other systems that may be found in a wireless communications network 100. The SON system 110 reads and/or writes data from/to these other systems. The other systems include one or more of a Network Operations Support System (OSS) 130, a planning tool 134, an alarm management system 138, a configuration management system 140, a geo-location system 144, and an antenna control system 148.

The data communicated between the SON system 110 and the OSS 130 may include on or more of Configuration Management (CM) parameters of wireless network elements such as cells, nodeBs, eNodeBs, RNCs, Mobility Management Entities (MMEs), gateways, UEs, et cetera; Performance Monitoring (PM) data collected from network elements, and event data (for example, layer 3 messaging) collected from network elements. In an embodiment, the SON system uses the OSS 130 to access and communicate with one or more of the alarm management system 138, the configuration management system 140, the geo-location system 144, and the antenna control system 148.

The data communicated between the SON system 110 and the planning tool 134 may include system configuration information such as locations of cells, locations of base stations, pointing directions of antennas, et cetera. The data communicated between the SON system 110 and the alarm management system 138 may include alarms generated by network elements and read by the SON system 100 from the alarm management system 138 and alarms generated by the SON system 110 and written to the alarm management system 138.

The data read by the SON system 110 from the geo-location system 144 may include estimates of the location of mobile devices served by the wireless communications network. The data communicated between the SON system 110 and the antenna control system 148 may include antenna electrical tilt, azimuth, and beamwidth settings, as well as information about the limits thereof, such as, for example, the minimum and maximum azimuth of an antenna or an indication of the beamwidths that an antenna can support. The data communicated between the SON system 110 and the configuration management system 140 may include configuration management parameters. Examples of configuration management parameters include base station transmit powers, handover thresholds, cell neighbor lists, et cetera.

The SON system may also directly interface with network elements such as RNCs 120a-120b, wireless base stations 122a-122g, and other devices not shown in FIG. 1, such as routers, switches, storage devices, et cetera.

Figure 2:
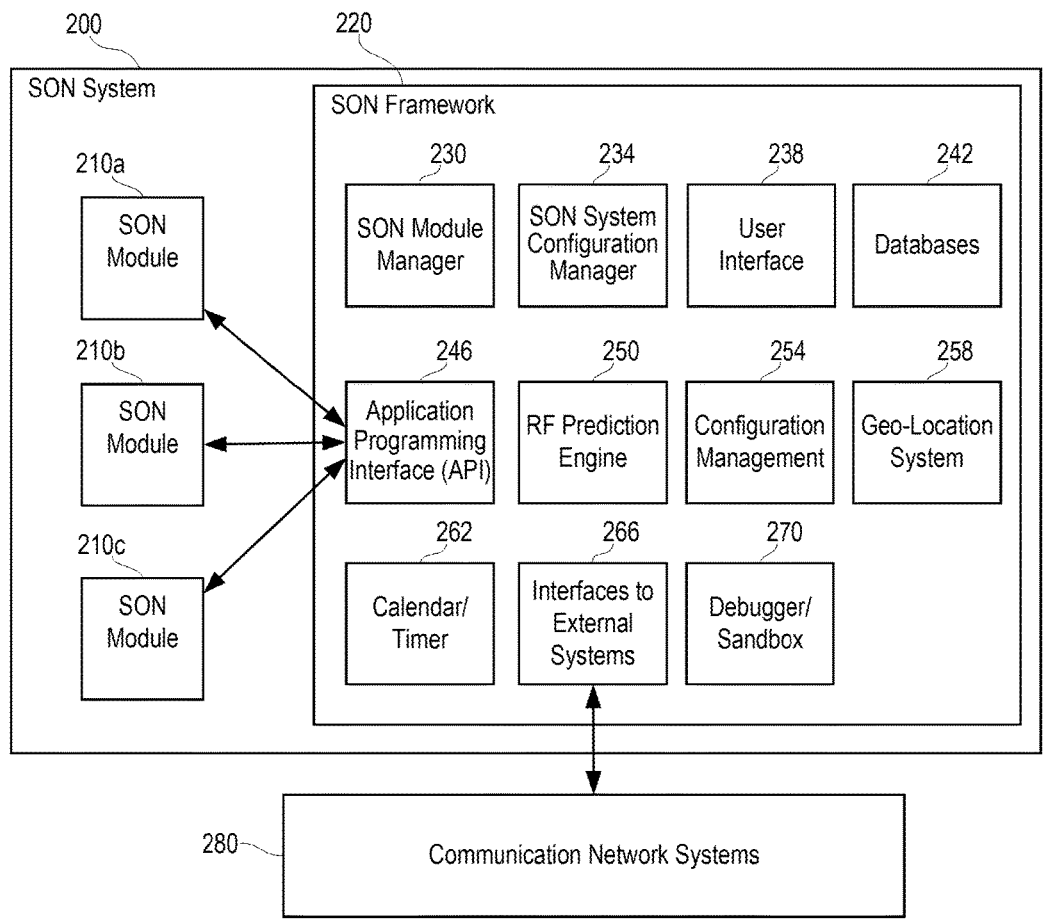
FIG. 2 illustrates a SON system according to an embodiment of the present disclosure.

FIG. 2 shows a block diagram of a SON system 200 according to an embodiment, suitable for use as SON system 110 in the wireless communication network 100 of FIG. 1. Using the SON system 200, third parties, that is, parties other than the provider of the SON system, may develop and implement SON functionality and deploy this functionality in a communications network.

The SON system 200 comprises a SON Framework 220 and first through third SON Modules 210a through 210c. The SON Framework 220 interfaces with external communication networking system 280; provides interfaces, resources, and functions for configuring and managing the SON system 200 (for example, user account configuration, SON Module prioritization, et cetera); and manages the operation of the SON Modules 210a-210c.

The SON Framework 220 includes a SON Module manager 230, a SON system configuration manager 234, a user interface 238, databases 242, an Application Programming Interface (API) 246, a Radio Frequency (RF) prediction engine 250, a configuration management system 254, a geo-location system 258, a calendar/timer 262, and a debugger/sandbox 270.

The databases 242 contain information for the operation of the SON system 200. The user interface 238 is used to manage and configure the SON system 200. The RF prediction engine 250 can be used to predict the impact of changing network parameters (for example, antenna tilts, RF transmit powers, and/or handover parameters) so that optimal changes to these parameters may be determined before they are changed in the network. For example, the RF prediction engine 250 may predict a change in a coverage footprint of a base station according to one or more network parameter values.

The configuration management system 254 records parameter changes applied by the SON system 200 to the network and may be capable of undoing these changes at a later time. The geo-location system 258 determines the location of devices, especially mobile devices, within the network. The calendar/timer generates timing events that can be sent to one or more of SON Modules 210a-210b or that permit on or more of SON Modules 210a-210b to be started and stopped at particular days and times.

The SON Modules 210a-210c contain logic that implements specific SON use cases. The SON Modules 210a-210c may be implemented as software codes that are dynamically linked to or instantiated by the SON Framework 220. SON Modules 210a-210c may be written in a platform independent programming language such as Python®, Perl®, Java®, et cetera, that can be invoked at run time. SON Modules 210a-210c may be provided in source code format or binary format.

The SON Modules 210a-210c interact with the SON Framework 220 via the API 246. Via the API 246, the SON Modules 210a-210c may utilize the functionality provided by the SON Framework 220, including one or more of reading data from external systems, writing data to external systems, receiving event information (for example, an alarm event from an alarm management system), displaying the results of SON operations (for example, display on a graphical user interface (GUI)), retrieving SON parameters specified by a user initiating a SON process, et cetera. In an embodiment, the API 246 comprises a plurality of APIs.

The API 246 provided by the SON Framework 220 may be an open API, that is, an API that provides sufficient functionality, stability, and documentation such that parties other than the provider of the SON system 200 can build and use SON Modules without the assistance or permission of that provider. For example, a developer other than the SON system provider may develop a SON Module that uses the capabilities provided by the API 246 and a network operator may load that SON Module into the SON system 200 through the SON Framework 220, all without the assistance, the permission, or the knowledge of the SON system provider.

The API 246 may abstract the interfaces to external systems in such a way that when, for example, the SON Module 210a has been written to provide SON functionality for a first OSS, the SON Module 210a may provide the same functionality for other OSSs without requiring changes to the SON Module 210a. In this case, the API 246 hides the details of reading and writing data to the OSSs from the SON Modules 210a-210c.

The SON Framework 220 also permits SON Modules 210a-210c to be added to and removed from the SON system. In this manner, new SON Modules may be introduced into the system at any time. This includes SON Modules developed by the provider or manufacturer of the SON system 200, SON Modules developed by the operator of the network in which the SON system 200 is operating, SON Modules developed by other third parties that develop SON functionality but that do not provide the other components of the SON Framework 220 that are required for a commercial SON product, and combinations thereof.

The SON Framework 220 may optionally provide support for the development of the SON Modules 210a-210c. However, SON Modules may also be developed using off the shelf software development tools that are not part of the SON Framework 220. Examples of such software development tools include Integrated Development Environments (IDEs) such as the Eclipse™, Visual Studio®, and IDLE IDEs, and text editors such as the Vim, Slickedit®, and Notepad++ editors. During development, initial testing of SON Modules 210a-210c may be done outside of the SON Framework 220. Canned data may be used to validate SON Module functionality.

The SON Framework 220 may provide support for debug of SON Modules 210a-210c through the Debugger/Sandbox 270. The Debugger/Sandbox 270 may include automatic logging of SON Module I/O activity and a Sandbox environment where SON Modules can execute but are precluded from changing some or all network parameters. When a SON Module is run in a sandbox environment, writes to network elements may be intercepted and logged by the SON Framework 220.

The Debugger/Sandbox 270 may provide debugging capabilities such as fault trapping, fault injection, single-step execution, code and data breakpoints, data watchpoints, data access pattern logging and analysis, code disassembly, code decompiling, static code analysis, code execution trace generation, trace-driven dynamic code analysis, et cetera.

The Debugger/Sandbox 270 may provide a sandbox environment that restricts the access a SON Module has to system resources. For example, a SON Module executing in the sandbox environment ("a sandboxed SON Module") may be prevented from reading and/or writing one or more storage devices such as a hard drive, FLASH memory device, et cetera. In another example, a sandboxed SON Module may be prevented from accessing any I/O devices, or may be restricted to accessing only a subset of the available I/O device.

In an embodiment, the restrictions imposed by the Debugger/Sandbox 270 may be based on the advertised functionality of the SON Module. For example, the sandboxed SON Module may include a manifest of the I/O devices the SON Module uses, and the Debugger/Sandbox 270 may restrict the sandboxed SON Module to using only those I/O devices and may signal an error if the sandboxed SON Module attempts to access any other I/O devices. Also, a user may impose additional restrictions on the resources that sandboxed SON Modules may access, or that a particular sandboxed SON Module can access.

In an embodiment, the Debugger/Sandbox 270 operates to prevent a sandboxed SON Module determining that the sandboxed SON Module is running in a sandbox, in order to prevent a SON Module, such as a SON Module that may include malware, from behaving differently in the sandbox environment compared to its behavior outside the sandboxed environment. To this end, the Debugger/Sandbox 270 may emulate or simulate parts of the SON System 200 or parts of the wireless communication system in which the SON System 200 operates. For example, the Debugger/Sandbox 270 may include a base station emulator that accepts and responds to commands the way a particular wireless base station would. In an embodiment, such sandbox emulation modules are plug-ins that may be loaded into the SON Framework 220. A sandbox emulation module for a device or system may be provided by the manufacturer or provider of the device or system.

In an embodiment, an emulation-enabled component of the SON System 200 or the wireless communication system includes emulation capabilities, and the Debugger/Sandbox 270 translates commands from the sandboxed SON Module into emulation commands to the emulation-enabled component, and translates emulated responses from the emulation-enabled component into responses to the sandboxed SON Module. For example, an antenna positioning system may include an emulation capability that, upon receiving an emulated antenna positioning command, responds with an emulated success/status response. The Debugger/Sandbox 270 may translate antenna positioning commands from a sandboxed SON Module into emulated antenna positioning commands to the antenna positioning system, and may translate the emulated success/status response from the antenna positioning system into a success/status response to the sandboxed SON Module, and the sandboxed SON Module will execute as if it were actually controlling the antenna positioning system.

The SON Framework 220 may allow SON Modules 210a-210c to be executed in an open-loop mode or a closed-loop mode. In the open-loop mode of operation of a SON Module, the SON Framework 220 does not allow parameter configuration changes to be pushed to the network. The SON Framework 220 may prompt a user when the SON Module wishes to push parameter configuration changes to the network. This provides a user with an opportunity to review the changes proposed by the SON Module and determine the impact of these changes on the network. If the user decides that the changes are acceptable, then the user may indicate to the SON Framework 220 that the changes can be pushed to the network. In closed loop mode of operation, a SON Module automatically pushes parameter configuration changes to the network without a user reviewing the changes.

In order to simplify the development of SON Modules 210a-210c, Module templates may be made available to developers. Module templates may include function templates for all user implemented functions, templates for implementing user configurable parameters, templates for reading Key Performance Indicators (KPIs) used by the SON Modules 210a-210c, et cetera. Such templates may allow for quick and easy development of user framework functions via a "fill in the blanks" approach. The SON Framework 220 may also allow, for example SON Module 210c to invoke SON Modules 210a and/or 210b already added to the SON system 200, further reducing the SON Module development effort.

The SON Framework 220 provides functionality to manage the SON Modules 210a-210c within the SON system. This includes the functionality to load (import) and remove the SON Modules 210a-210c into/from the SON system 200. This functionality may include a user interface to allow users to select which modules may be loaded into or removed from the SON system 200. In an embodiment, the SON Framework determines information about SON Modules at the time that Modules are imported into the framework.

Figure 3:
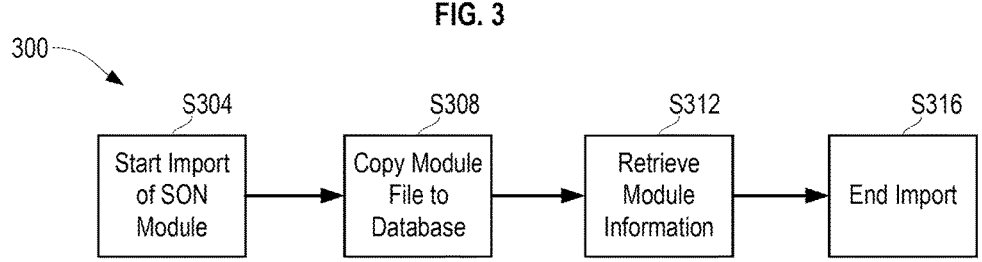
FIG. 3 is a flowchart of a process for importing a SON Module into a SON system according to an embodiment.

FIG. 3 is a flowchart of a process for importing a SON Module according to an embodiment. At S304, a user initiates the importing of a SON Module via a user interface. The SON Framework may be configured to only permit SON Modules to be imported into the SON System by users with the appropriate privileges (for example, by users having Administrator or Module Manager privileges).

In an embodiment, a user may be permitted to load a SON Module into a debugger/sandbox environment for development, testing, and debugging but not be permitted to load the SON Module into the operational portion of the SON Framework. In an embodiment, the SON Framework includes a candidate queue for SON Modules, and a user may be permitted to load a SON Module into the candidate queue but not into the operational portions of the SON system. In an embodiment, a user with the appropriate privileges may be able to release a SON Module from the debugger/sandbox environment and/or the candidate queue into the operational portion of the SON system, thereby initiating the SON Module import process.

In an embodiment, a user may only be permitted to load authorized SON Modules. Whether a SON Module is authorized may be determined using a cryptographic signature, a comparison of an identifier of the SON Module to a list of authorized SON Module identifiers, or a query to a local or remote database using an identifier of the SON Module. The identifier may include a checksum of, a hash of, or a cryptograph hash of the contents of the SON Module.

At S308, the SON Module is copied to a database in the SON Framework and/or stored in a file system used by the SON Framework. In an embodiment, when the SON Module being imported is already present in the database or file system as a different version, the previously-loaded version of the SON Module is backed up rather than being overwritten by the new version of the SON Module, and the SON Framework provides a capability to roll back a SON Module to the previously-loaded version. The SON Framework may also determine differences between the new and previously-loaded versions of the SON Module, including differences in the advertised functionality of, the events monitored by, and the network resources used by the SON Module.

At S312, information about the imported SON Module is retrieved. The information may be retrieved by calling specific functions coded by the author of the SON Module, or may be provided as meta-data, such as, for example, a manifest, associated with the SON Module. Examples of the types of information extracted from the SON Module during the import processes includes the name of main function to be called, KPIs that the Module will use, events upon which the Module is to be triggered, et cetera.

At S316, the importing of the SON Module is complete. In an embodiment, a notification of importation of the SON module is sent to a designated user, administrator, or operator of the SON system. In an embodiment, the provider of the SON Module may be notified that the module has been imported into the SON system.

SON Modules may contain software functions that may be called by the SON Framework. These functions allow the SON Framework to manage SON Modules and to inform the SON Modules when specific events have been detected by the SON Framework.

Some of these functions may be required to be implemented by all SON Modules. Some of these functions may be optional and only be implemented by some SON Modules. If an optional function is not implemented, the SON Framework may assume that the SON Module has no data to return for the parameters associated with the function. In this case, the SON Framework may use default settings for the data that would otherwise be returned if the function were implemented. Whether an optional function is implemented by a SON Module may be indicated in a manifest associated with the SON Module, through a required function implemented by the SON Module, or by an exception or fault mechanism invoked whenever an unimplemented optional function is called, among other methods.

Many of the framework callable functions of the SON Module may be called by the SON Framework when a Module is imported into the SON Framework. In this way, the SON Framework may retrieve information about the SON Module. This information may allow the SON Framework to display information about a SON Module to a user and to start and stop the execution of the SON Module in a controlled fashion.

Other framework callable functions of the SON Module may be called when external events occur—e.g., new KPI data being retrieved from the network, a new alarm being received from the alarm management system, et cetera.

FIG. 4 is a table of mandatory SON Framework callable functions according to an embodiment. FIG. 5 is a table of optional framework callable functions according to an embodiment. The tables of FIGS. 4 and 5 also show when the SON Framework may call these functions.

Prior to or as part of the process of starting a SON Module, the user starting the module may specify values for configuration parameters used by the SON Module. The SON Framework provides a SON Module configuration interface through which users can set values for configuration parameters used by the SON Module.

Figure 8:
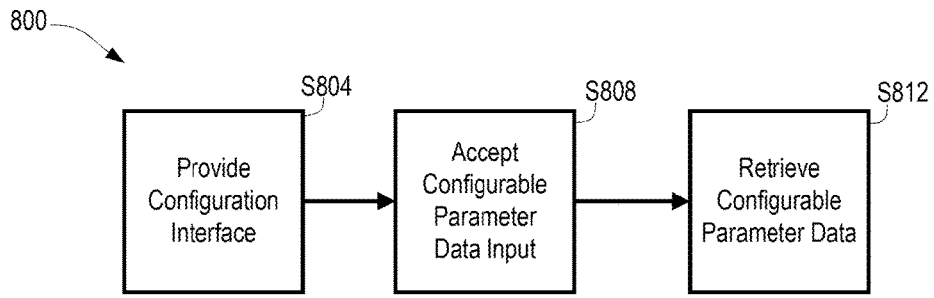
FIG. 8 is a flowchart of a process associated with SON Module configurable parameter data according to an embodiment.

In an embodiment, shown in FIG. 8 as a process 800, the SON Framework API at S804 provides a parameter data interface through which, at S808, the SON Framework can receive parameter names, parameters descriptions, parameter types, default values, and parameter ranges for a SON Module. This information is collectively known as the configurable parameter data for a SON Module. The SON Framework may, at S812, retrieve the configurable parameter data when the SON Module is imported into the SON Framework, or when the SON Module is started.

Parameters types that can be specified may include integers, floating point values, strings, files (which may cause a file selection dialog box to be displayed when a module is started), list of values, date/time, et cetera. Default parameters values may be specified in the SON Module and communicated to the SON Framework as part of the configurable parameter information.

In an embodiment, configurable parameter data is communicated using a markup language such as eXtensible Markup Language (XML) or JavaScript Object Notation (JSON). The configurable parameter data may also be communicated according to one or more schemas defined by a schema language such as XML Schema or JSON Schema.

Figure 6A:
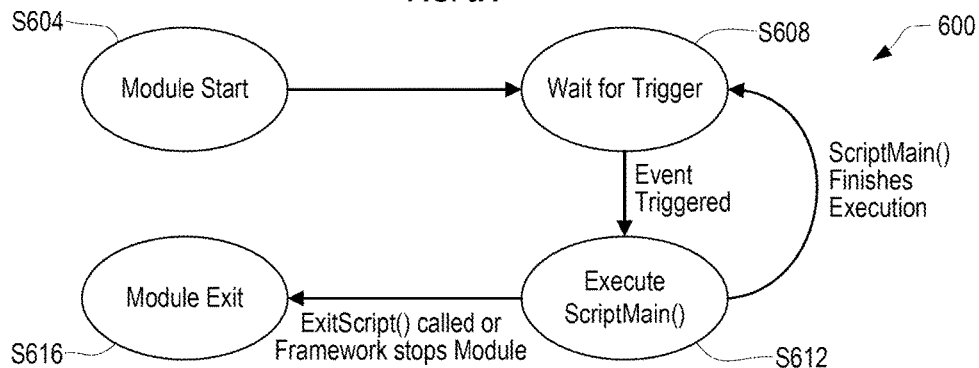
FIGS. 6a-6c are state diagrams related to a SON Module according to an embodiment.

In an embodiment, SON Modules may be implemented as state machines. A state machine 600 implementing a SON Module is shown in FIG. 6A. The states shown in FIG. 6A are a module start state S604, a wait for trigger state S608, an execute ScriptMain state S612, and a module exit state S616, which correspond to first through fourth states, respectively.

At the module start state S604, a SON Module has been started. The internal data of the SON Module is initialized. At the wait for trigger state S608, the SON Module is waiting for an external event trigger. At the execute ScriptMain state S612, the SON Module is performing its main processing using a call to a ScriptMain function shown in FIG. 4. At the module exit state S616, the SON Module has exited and the SON Framework may perform clean-up operations.

Stateful SON Modules are coded with state transitions in mind. The transition between states may be managed by the SON Framework.

Stateful SON Modules permit the implementation of both recurring and non-recurring SON Modules. Non-recurring SON Modules are designed to accept user input parameters and to perform one-pass execution. Such SON Modules may be user-triggered or calendar-triggered. In the state diagram shown in FIG. 6A, all SON Modules automatically trigger on a SON Module execution start. This allows non-recurring SON Modules to proceed to the ScriptMain function immediately and run to completion.

An example of a SON Module that may be implemented as non-recurring SON Modules is a SON Module to push parameters to one or more base stations selected by a user. Another example of a non-recurring SON Module is an audit SON Module that reads information from network base stations, compares the information with user inputs (for example, a file of expected or target values), and flags discrepancies that it finds.

Figure 6B:
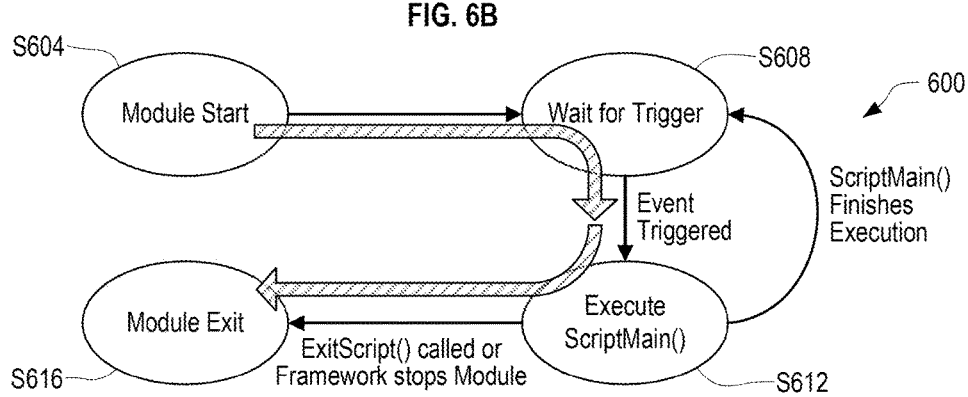

The state transition flow taken in a non-recurring SON Module is shown in FIG. 6B. The state machine 600 proceeds from the module start state S604 to the wait for trigger state S608 and then to the execute ScriptMain state S612. When the ScriptMain function exits or the SON Framework stops the SON Module, the state machine 600 enters the module exit state S604.

Figure 9:
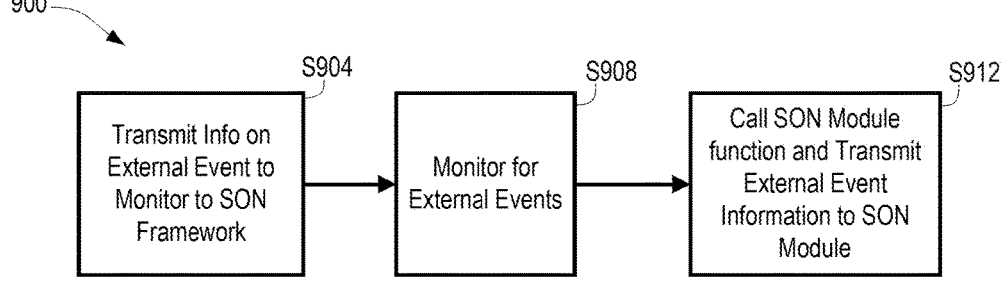
FIG. 9 is a flowchart of a process associated with communicating event information to a SON Module according to an embodiment.

Recurring SON Modules are designed to execute on external triggers/events (for example, the arrival of new KPI data, a periodic event generated by a timer, et cetera) that the SON Module receives via the SON Framework. As shown in FIG. 9 as a process 900, the SON Modules at S904 inform the SON Framework of which events the SON Module is designed to be notified of, that is, events of interest to the SON Module. At S908, the SON Framework monitors for the events of interest. At S912, the SON Framework calls the main SON Module function (for example, ScriptMain) whenever an event of interest occurs. The SON Module takes appropriate actions based on the received event and data associated with the received event, including data that may be provided by the SON Framework when the main SON Module function is called.

Recurring SON Modules may be designed to run indefinitely. Examples of recurring SON Modules include a cell outage compensation SON Module, an ongoing load balancing SON Module, and a green network SON Module.

Figure 6C:
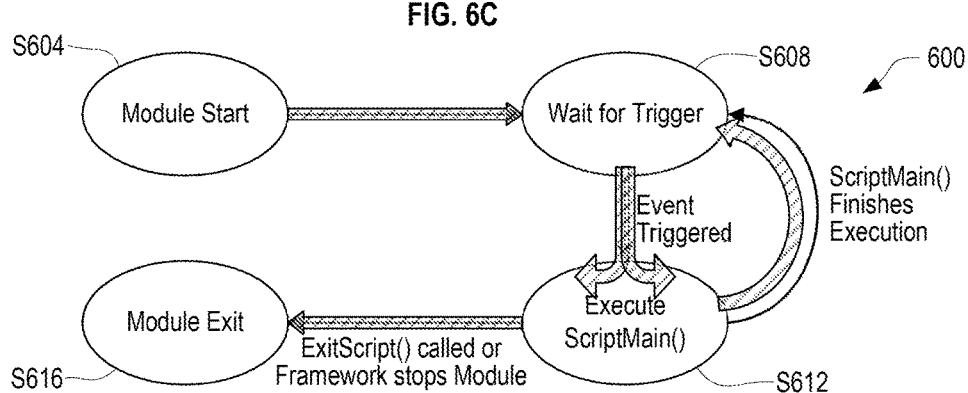

The state transition flow taken in a recurring SON Module is shown in FIG. 6C. The state machine 600 proceeds from the module start state S604 to the wait for trigger state S608 and then to the execute ScriptMain state S612. In the execute ScriptMain state S612, the SON Framework executes the ScriptMain function of the SON Module.

The ScriptMain function may perform initialization actions. When the ScriptMain function finishes execution, the state machine 600 proceeds to the wait for trigger state S608. When an event of interest to the SON Module occurs, the state machine 600 proceeds to the execute ScriptMain state S612.

The above cycle of transitions between the wait for trigger state S608 and then to the execute ScriptMain state S612 may proceed indefinitely until an error or event occurs that terminates the cycle. For example, when the SON Module determines that it is no longer necessary, no longer appropriate, or not functioning properly, the SON Module may call the ExitScript function. In another example, the SON Framework may determine that the SON Module is no longer necessary, no longer appropriate, or not functioning properly and may stop the SON Module.

In an embodiment, a temporal limit on the execution of the SON Module is determined by the SON Module or the SON Framework, and when the temporal limit is reached or exceed, the SON Module calls the ExitScript function or the SON framework stops the SON Module. For example, a license for the SON Module may specify a temporal limitation of one or more of a number of hours that the SON Module may be executed and a date past which the SON Module may not be executed, and the SON Module or SON Framework or both enforce the temporal limitation. The temporal limitation may be included in a manifest accompanying the SON Module, incorporated into the executable code of the SON Module, or manually configured by a user or administrator of the SON system.

When the SON Module calls the ExitScript function or the SON Framework stops the SON Module, the state machine 600 proceeds to the module exit state S616.

The SON Framework may permit currently running Modules to create and launch additional Modules. SON Modules launched from the Framework User Interface are known as parent Modules. SON Modules launched by currently running SON Modules are known as child Modules.

In an embodiment, the SON Module state flow diagram of child Modules is the same as that of parent SON Modules. Child SON Modules may be used to monitor a SON event and manage changes to the network during that event. Examples of this usage of child SON Modules include a child SON Module that monitors a base station outage and restores network parameters once the base station is back online and a child SON Module that monitors a base station loading imbalance and restores network parameters once the load imbalance event has passed.

Figure 10:
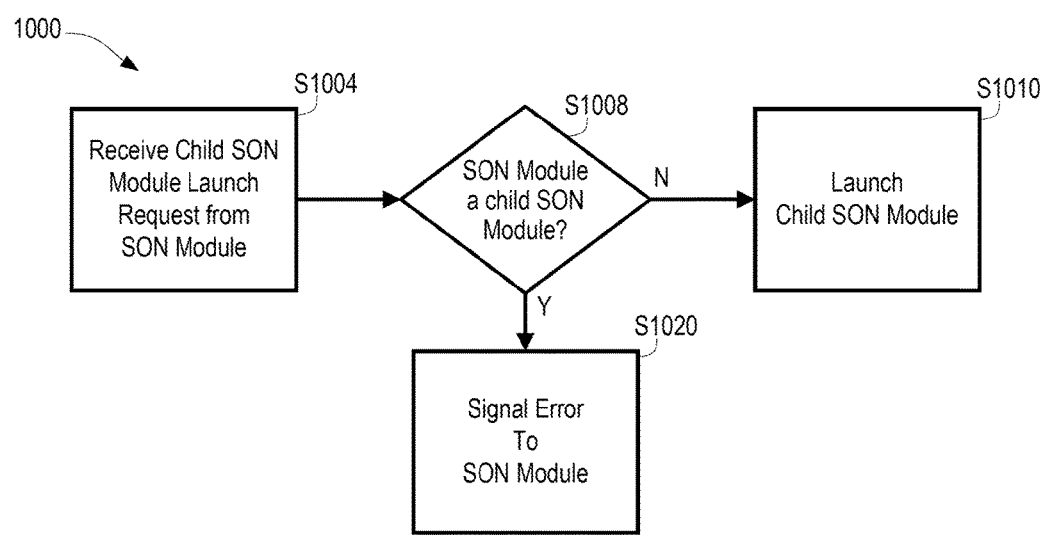
FIG. 10 is a flowchart of a process of launching a child SON Module according to an embodiment.

In an embodiment shown in FIG. 10 as a process 1000, the SON Framework may only permit Parent SON Modules to launch child SON Modules and not permit child SON Modules to launch additional child SON Modules. At S1004, the SON Framework receives a request to launch a child SON Module from a SON Module. At S1008, the SON Framework determines whether the SON Module making the request is itself a child Son Module. When the SON Module is not a child SON Module, at S1010 the child SON Module is launched. When the SON Module is a child SON Module, at S1020 the child SON Module is not launched and an error indication may be provided to the SON Module.

In an embodiment, permission to launch child SON Modules may be granted according to the user who launched the parent SON Module, the source or author of the parent SON Module, or a digital certificate associated with the parent SON Module. In an embodiment, an administer grants permission to launch child SON Modules to individual parent SON Modules.

In an embodiment, the SON Framework runs each SON Module in its own separate computing process space. Each SON Module, including Child SON Modules, may have its own memory space and be restricted from directly reading or writing to memory outside of this space. A SON Module may be run in a virtual machine comprising one or more of a separate computing process space, virtual storage devices, and virtual Input/Output (I/O) devices.

Providing a separate memory space to a module protects the SON Module from other SON Modules, and allows the SON Framework to take advantage of multi-core server platforms or multi-server platforms by executing each SON Module on a different processor or a different server when multiple SON Modules are running. This results in increased performance of the SON System.

Figure 11:
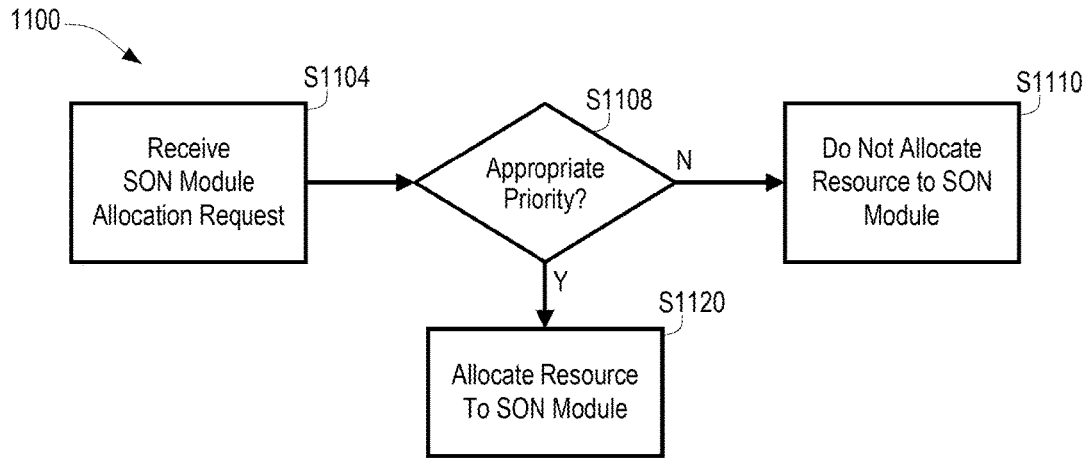
FIG. 11 is a flowchart of a process of allocating a resource to a SON Module according to a priority, according to an embodiment.

As shown in a process 1100 of FIG. 11, SON Module prioritization can be implemented by setting the processes priority of each SON Module. SON Module prioritization may be used to determine allocation of computing resources (for example, processor execution time and/or physical memory allocation), ordering of event handling, and ownership of network resources. Each SON Module may include a plurality of priorities, each priority associated with a different ordering scheme, resource, or collection of resources.

As S1104, the SON Framework receives a request for a resource from or for a SON Module. At S1108, the SON Framework evaluates whether the associated SON Module has the appropriate priority to be allocated the resource, for example, a higher priority than another SON Module and/or a priority greater than a current minimum priority. When the priority is appropriate, at S1120 the resource is allocated to the SON Module. When the priority is not appropriate, at S1110 the resource is not allocated to the SON Module.

The SON Framework may manage creation and termination of processes for SON Modules. This eases the implementation of SON Modules by removing the need for SON Module developers to address thread safe programming issues, et cetera.

The SON Framework Event Manager detects when external events occur and sends information about the detected events to the relevant SON Modules. Examples of events that the Framework Event Manager may handle include new KPI available events, new alarm events, new timer or calendar events, and configuration change events. The SON Framework may monitor configuration changes made to the network by external systems and automatically notify SON Modules requesting notification of such changes.

In an embodiment, the events may be identified by constant values that are communicated via the API. An example of such constants is shown in FIG. 7.

When a SON Module is selected for execution by a user, the SON Framework may permit the user to configure data that controls the operation of the SON Module. The types of data that a user configures may include user configurable parameters, targets against which the SON Module shall execute SON processes, which new targets should be added to the list of targets for the SON Module, and when the SON Module should be executed.

In a wireless communications network, the targets against which the SON Module executes SON processes may be network cells (e.g., a cell defined by a single UMTS or LTE carrier), network base stations, radio network controllers, or other suitable targets for a SON process. A SON Module may be configured so that the SON Framework automatically adds new targets to the list of targets for the SON Module, such as new targets that appear in a geographic area, new targets that are co-located with existing targets, new targets that are managed and controlled by the same network element as existing targets, new targets that connect to the wireless network through a designated communications channel (such as new HeNBs connecting to the network through an ISP), et cetera.

A SON Module may be configured to execute immediately or at a later time and/or date. A SON Module may also be configured to execute during one or more selected periods of time, such as for a period of time beginning immediately and having a predetermined end time, a predetermined period of time during each day, a predetermined period of time each week, a predetermined period of time during each calendar quarter or fiscal quarter, and so on.

A user may configure the data that controls the operation of the SON Module via a User Interface provided by the SON Framework. In an embodiment, the User Interface is only available on designated devices. In an embodiment, the User Interface may be accessed from a location remote from the wireless network using a Virtual Private Network (VPN) or other secured communication channel.

Errors in SON Modules may cause unwanted data to be written to network elements, which could cause problems in the network. In addition, users may deliberately or unknowingly attempt to introduce rogue or altered SON Modules into the network to cause damage to the network. For these and other reasons, the SON Framework may provide security features that limit the effects that SON Modules may have on the communications network.

Accordingly, the SON Framework may only permit SON Modules to access OSS parameters and other network element parameters via the SON Framework API, may support 'undo' of network changes applied via the API, and may enforce restrictions on external functionality that is available to SON Modules that could otherwise be made available via an import function.

For example, if SON Modules are implemented in the Python scripting language the SON Framework may only permit SON Modules to import 'safe' standard modules (that is, standard modules such as copy, re, math, json, sys, et cetera, that cannot be used by a SON module to cause arbitrary code to be executed on the SON system), and not permit import of 'unsafe' standard modules (that is, standard modules such as os, shutil, urllib, smtplib, et cetera, that can be used by a SON module to cause arbitrary code to be executed on the SON system).

The SON Framework may restrict the maximum number of network elements (for example, cells) against which a SON Module may be run, that is, the number of network elements that the SON Module may monitor and/or control. This maximum number of network elements may be configured to a different value for each user or for each SON Module.

The SON Framework may restrict the maximum number of SON Modules a user may run simultaneously. This maximum number of SON Modules may be configured to be a different value for each user.

The SON Framework may only permit SON Modules that have acceptable digital signatures to be imported. The Framework may be provisioned with certificates containing public keys or other keys that may be used to verify the digital signatures. The SON Framework may also permit SON Modules to access selected network resources or elements only if the SON Module has an acceptable digital signature.

In an embodiment, the SON Framework may require a SON Module that requires access to selected network resources or elements to have a first digital signature that permits the SON Module to be imported and a second digital signature that permits the SON Module to access the selected network resources or elements. The first digital signature and the second digital signature may originate from different signers. For example, the first digital signature may be provided by a vendor of the SON Module, and the second digital signature may be provided by one or more owners and/or operators of one or more of the selected network resources or elements.

The SON Framework may leverage other security features provided by a host operating system to provide added security to the SON system, including user account controls, file system encryption, trusted platform modules, and so on.

The SON Framework may also provide functionality to automatically log events that occur in the SON System. SON Modules may also send information to the SON Framework that is automatically logged by the SON Framework. These logs may be later retrieved by users via the User Interface.

The SON Framework may also log parameters written to network elements by the SON Modules. This may also permit rollback of those changes. Rollback may be implemented by restoring parameters to the values that were in place before a SON Module was launched or by restoring parameters to the values that were in place at a previous time and date.

When the SON Framework incorporates an RF prediction engine that can generate prediction of the coverage of network cells, the RF prediction engine can be used to predict network coverage before parameter changes are applied.

The SON Framework may provide an API via which SON Modules may interact with the RF prediction engine. This allows SON Modules to predict the impact of making changes to antenna tilts, RF pilot power, et cetera. In this manner a SON Module may decide on optimal settings of configurable parameters.

The RF prediction engine may incorporate components from RF planning tools used by operators to plan the placement of RF network elements (e.g., wireless base stations).

A SON Module may instruct the RF prediction engine to run an analysis and return results of the analysis through the API. The SON Modules may display the results of the analysis to a user via appropriate SON Framework API functions.

The SON Framework may provide functionality whereby SON Modules may 'lock' network elements such as wireless network cells, sectors, or base stations so that other SON Modules are prevented from making changes to them. This functionality may be used by Modules that are making parameter changes to cells in one part or the network where it is desirable to prevent parameter changes from being overwritten by other Modules. A lock may apply to an entire network element or to only selected functions or parameters of the network element.

Here, locking and unlocking network elements refers to a SON Framework lock only. This is not the same as locking or unlocking a network element as would be performed by an OSS, which refers to disallowing or allowing a network element to provide service.

If the SON Framework supports prioritization of SON Modules then the Framework may permit a higher priority SON Module to take a lock from a lower priority SON Module. The SON Framework may return the lock to the lower priority SON Module when the higher priority SON Module releases the lock, or may return the locked network element to an unlocked state. In an embodiment, the SON Framework notifies a first SON Module when it loses the lock to a second SON Module, and the first SON Module when so notified may clean up or roll back the operations it was performing during the time it had the lock.

The SON Framework may also provide a SON Function Library consisting of SON specific functions that may be used in multiple SON Modules. Examples of such functions are functions that relate to calculating antenna beamwidths, pointing angles, inter site distances, et cetera.

The SON Framework may support user accounts for users of the SON system. Each user account may have associated user permissions that can be configured by administrators of the SON system.

Examples of the types of user permissions that may be configured include permissions related to importing SON Modules, permissions related to executing SON Modules (e.g., whether a user may or may not execute any SON modules, or a subset of SON Modules), permissions related to the number of network elements that a user may select as targets of a SON Module (e.g., no more than 100 cells may be selected as a target by a user), and permissions related to the maximum number of SON Modules a user may execute simultaneously or during a given time period (e.g., a user may only execute up to five SON Modules simultaneously).

The SON Framework may provide a SON Module status information interface that enables users to determine the current execution status of SON Modules. The status may include details on the percentage completion of execution of a Module, access to the logs generated by each Module, a graphical map view of the targets (e.g., cells, base stations) for each module, details on the SON actions taken by each module, et cetera.

The SON Framework may contain mechanisms whereby SON Modules may provide alerts to the users of the SON system that a SON event has taken place. These alerts may take the form of one or more of a notification by email, text messaging, instant messaging or other such message delivery mechanism, an audible message created using a recording or a speech synthesizer and delivered telephonically, a notification sent to the external alarm management system, and a notification sent to a graphical user interface. A SON Event may be detection of a cell in an outage condition and taking action to continue to provide coverage in the area of the outage.

When a notification is received by a user, the user may be able to review additional information regarding the event via the SON Framework user interface. In an embodiment, the SON Framework provides the user with a map showing cells in the network that have been impacted by the event. For example, if a cell outage has been detected then the map on the user interface may show the cell where the outage has taken place, along with which of the neighboring cells have had their parameters adjusted to compensate.

The SON Framework may provide a mechanism via the API for a SON Module to send arbitrary information to the SON Framework that the SON Framework may display. The information sent may include a list of cells and actions that the SON Framework should take if the user selects one of the cells from the map. A cell may be selected by clicking on a cell icon on the map. Actions may include highlighting the selected cell and other cells in colors specified in the information sent by the SON Module.

The SON Framework may reserve space on the user interface so that SON alerts are displayed no matter what other information is being displayed on the user interface. The SON Framework may also filter SON alerts so that they are sent to a predetermined user or set of users of the SON system. For example, alerts may only be sent to one or more of a user that launched a SON Module, a user that has been designated to receive alerts regarding a particular cell, and a user that has been designated to receive alerts regarding cells in a geographic region.

The SON Framework may also determine where to send alerts according to the time of the alert or the current time, such as by sending an alert to a person who is scheduled to be on-duty or available to handle the alert at the present time. The SON Framework may also resend a SON alert, or send the alert to a different device or person, if the condition that generated the SON alert persists for a predetermined time after the SON alert was last sent, or if an acknowledgement of the SON alert is not received by the SON Framework.

The SON Framework incorporates a user interface whereby users may interact with the SON System. The SON Framework also provides an API via which SON Modules may determine what information and/or types of information are displayed on the user interface.

The user interface may take one or more of several forms, such as a standalone application installed on an external computer that communicates with the SON system, a web application that runs in the browser of an external computer, and an application running on one of the SON system computers that a user accesses via a remote login or via a terminal connected to the SON system.

The user interface may present information on a number of software defined views or tabs. The SON Framework manages the information that is displayed to each user. Each user is provided with an account on the SON system. Users may be provided with a username and password and may have to log in to the SON System in order to access the user interface. In an embodiment, a user may have to prove possession of a predetermined physical device (such as a smart card, an ID badge, a security token, or a computing device such as a smart phone running an secure key generator) in order to log in. Proving possession may include entering a key generated by the physical device, plugging the device into an input/output port, swiping the physical device over or through a scanner, or the like.

The user interface may provide a SON Module status interface/view that enables users to view the status of each of the running SON Modules. The status view may include a log generated by the SON Modules. The log may contain information captured by the SON Framework, as well as information explicitly logged by the SON Modules via a SON Framework API call. The status view may also contain a map view showing the location of the Module targets (e.g., cells and base stations). The status view may also show the values that the user assigned to the Module configurable parameters at the time that a SON Module was launched.

The user interface may contain a SON Module launching interface that enables a user to select a SON Module, configure the SON Module, and launch the SON Module. The user interface may allow SON configurable parameters to be configured and targets for the SON Module to be selected.

When the targets for the SON Module are cells, the target cells may be selected by clicking on cell icons on a map view, by typing in the name of cells into a text field, by selecting pre-defined clusters of cells, or by other methods of selecting cells. The user interface may provide a mechanism to filter cells by one or more user specified characteristic (for example, cells operating on a particular set of carrier frequencies, or cells of a particular technology type) so that only filtered cells are available for selection. A similar interface may be used to select other kinds of network elements as targets.

The user interface may allow viewing some or all of the software code that implements a SON Module. A user may examine the software code to better understand the behavior of a SON Module.

The user interface may provide a map view that allow a user to browse the location of cells in the network. From this view, a user may be able to select one or more cells as a cluster of cells. The user interface may provide a cluster definition interface that permits the user to define and name the cluster of cells so that this cluster may be selected by name by the user at a later time.

The user interface may provide a network element configuration interface through which a user may view and edit the configurable parameters of network elements.

The user interface may provide historic performance data and key performance indicators for network elements to a user. This data may be automatically collected by the SON system and/or the SON Framework, and may be presented as a time series plot or in a tabular format. The user interface may provide a clipboard function that enables a user to copy this data so that it may be pasted into other applications running on the user's computer.

The user interface may provide a user account management interface for configuring user account information, including creation of new user accounts, setting of account user permissions and passwords, and removal of user accounts.

The user interface may provide a network topology management interface for configuring the network topology stored within the SON system. The topology may store information about network elements that may be targeted by the SON system.

The network topology may be determined by reading information about the network from files or databases such as those that may be part of the OSS or of a network planning tool. The network topology may include information such as the location of each network element and other information related to each network element. The topology information may be stored in the SON system database.

Figure 12:
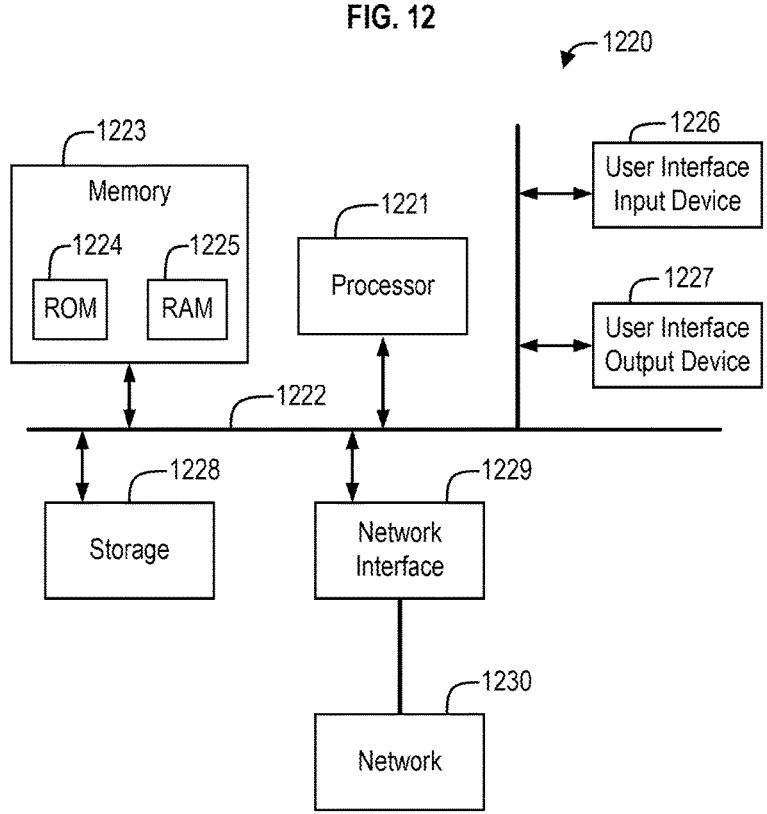
FIG. 12 illustrates a computer system according to an embodiment.

Embodiments of the present disclosure may be implemented in a computer system and/or embodied using computer programming instructions stored on a non-transitory computer readable medium. FIG. 12 illustrates a computer system 1220 including a processor 1221, a bus 1222, a memory 1223, and a user interface input device 1226, a user interface output device 1227, a storage 1228, and a network interface 12229 that is coupled to a network 1230. The processor 1221 may be a central processing unit (CPU) or a semiconductor device that executes processing instructions stored in the memory 1223 and/or the storage 1228.

The memory 1223 and the storage 1228 may include various forms of volatile or non-volatile storage media, for example, the memory 1223 may include a ROM 1224 and a RAM 1225, and the storage 1228 may include a hard disk drive (HDD), solid-state drive (SSD), CD-ROM, DVD-ROM, and so on. The memory 1223 and/or the storage 1228 may include computer executable instructions stored thereon.

Accordingly, an embodiment of the present disclosure may be implemented as a computer implemented method or as a non-transitory computer readable medium with computer executable instructions stored thereon. In an embodiment, when executed by the processor, the computer readable instructions may perform a method according to at least one aspect of the present disclosure.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for running a Self Organizing Network (SON) module in a communication network, the method comprising:
providing an open Application Programming Interface (API) for a SON framework in a SON system;
providing, through the API, a sandbox environment of the SON system adapted to execute a SON module, wherein a SON module executed using the sandbox environment cannot change network parameters; and
executing the SON module using the sandbox environment,
wherein the SON module accesses the functionality of the SON framework using the API.

2. The method of claim 1, further comprising:
loading the SON module into the SON framework through a user interface.

3. The method of claim 2, wherein the SON module is built by a developer other than a SON system provider and loaded into the SON framework by an operator other than the SON system provider.

4. The method of claim 2, wherein the SON module is implemented as a state machine.

5. The method of claim 1, further comprising providing, through the API, a Radio Frequency (RF) prediction engine of the SON system to the SON module, the RF prediction engine providing a prediction of an impact of a change of one or more network parameters.

6. The method of claim 1, further comprising:
providing, through the API, a geo-location function of the SON system to the SON module, the geo-location function providing a location of one or more network devices.

7. The method of claim 1, wherein in the sandbox environment, writes to network elements are intercepted and logged by the SON Framework.

8. The method of claim 1, wherein the sandbox environment includes a base station emulator that accepts and responds to commands in the same manner as an actual base station.

9. The method of claim 1, wherein the sandbox environment includes an emulation-enabled component that translates commands from the sandboxed SON Module into emulation commands to the emulation-enabled component, and translates emulated responses from the emulation-enabled component into responses to the sandboxed SON Module.

10. The method of claim 1, further comprising:
initiating a SON module import process by releasing the SON module from the sandbox environment into an operational portion of the SON system.

11. A Self Organizing Network (SON) system for automating functions in a communication network, comprising at least one computer system including a SON framework, wherein the at least one computer system is configured to:
provide an open Application Programming Interface (API) for the SON framework; and
execute a SON module; and
providing, through the API, a sandbox environment of the SON system adapted to execute a SON module, wherein the SON module executed using the sandbox environment cannot change network parameters,
wherein the SON module accesses the functionality of the SON framework using the API.

12. The system of claim 11, wherein the system is further configured to load the SON module into the SON framework through a user interface.

13. The system of claim 12, wherein the SON module is built by a developer other than a SON system provider and loaded into the SON framework by an operator other than the SON system provider.

14. The system of claim 11, wherein the SON module is implemented as a state machine.

15. The system of claim 11, wherein in the sandbox environment, writes to network elements are intercepted and logged by the SON Framework.

16. The system of claim 11, wherein the sandbox environment includes a base station emulator that accepts and responds to commands in the same manner as an actual base station.

17. The system of claim 11, wherein the sandbox environment includes an emulation-enabled component that translates commands from the sandboxed SON Module into emulation commands to the emulation-enabled component, and translates emulated responses from the emulation-enabled component into responses to the sandboxed SON Module.

18. The system of claim 11, wherein the system is further configured to initiate a SON module import process by releasing the SON module from the sandbox environment into an operational portion of the SON system.

19. The system of claim 11, wherein the system is further configured to provide, through the API, a Radio Frequency (RF) prediction engine of the SON system to the SON module, the RF prediction engine providing a prediction of an impact of a change of one or more network parameters.

20. The system of claim 11, wherein the system is further configured to provide, through the API, a geo-location function of the SON system to the SON module, the geo-location function providing a location of one or more network devices.

21. A non-transitory computer-readable medium with computer-executable instructions for running a Self Organizing Network (SON) module in a communication network stored thereon, which, when executed by one or more processor, perform a method comprising:
providing an open Application Programming Interface (API) for a SON framework in a SON system;
providing, through the API, a sandbox environment of the SON system adapted to execute a SON module, wherein the SON module executed using the sandbox environment cannot change network parameters; and
executing the SON module using the sandbox environment,
wherein the SON module accesses the functionality of the SON framework using the API.

* * * * *